(12) United States Patent
Ercan et al.

(10) Patent No.: US 12,394,013 B1
(45) Date of Patent: Aug. 19, 2025

(54) ADJUSTING USER DATA BASED ON A DISPLAY FRAME RATE

(71) Applicant: Apple Inc., Cupertino, CA (US)

(72) Inventors: Ali Ercan, San Jose, CA (US); David M. Teitelbaum, San Francisco, CA (US); David J. Meyer, Menlo Park, CA (US); Julian K. Shutzberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/370,365

(22) Filed: Sep. 19, 2023

Related U.S. Application Data

(60) Provisional application No. 63/409,183, filed on Sep. 22, 2022.

(51) Int. Cl.
*G06T 3/4007* (2024.01)
*G06F 3/01* (2006.01)
*G06T 19/00* (2011.01)

(52) U.S. Cl.
CPC ............ *G06T 3/4007* (2013.01); *G06F 3/013* (2013.01); *G06T 19/006* (2013.01); *G06T 2200/24* (2013.01)

(58) Field of Classification Search
CPC ...................................................... G06T 3/4007
USPC ........................................................ 345/156
See application file for complete search history.

(56) References Cited

U.S. PATENT DOCUMENTS

| | | | |
|---|---|---|---|
| 2012/0188398 A1 | 7/2012 | Kusaka | |
| 2013/0257752 A1* | 10/2013 | Tripathi | G09G 3/20 345/545 |
| 2014/0376773 A1* | 12/2014 | Holz | G06F 3/0304 382/103 |
| 2015/0363639 A1 | 12/2015 | Stanek et al. | |
| 2016/0178904 A1* | 6/2016 | Deleeuw | H04N 13/366 345/8 |
| 2017/0153736 A1* | 6/2017 | Kim | G06F 3/0443 |
| 2017/0178408 A1* | 6/2017 | Bavor, Jr. | G06T 19/006 |
| 2021/0085244 A1 | 3/2021 | Trigueiros Da Silva Cunha et al. | |
| 2022/0066221 A1* | 3/2022 | Yoon | G06F 3/017 |

FOREIGN PATENT DOCUMENTS

WO    WO 2015033327    3/2015

* cited by examiner

*Primary Examiner* — Long D Pham
(74) *Attorney, Agent, or Firm* — Thompson Hine LLP

(57) ABSTRACT

Various implementations identify user input based on the intended display frame rate and the adjusted user data. For example, an example process may include obtaining user data associated with an activity of a user via a sensor in a physical environment. The process may further include obtaining an intended display frame rate corresponding to one or more portions of a user interface being presented within an extended reality (XR) environment, where the intended display frame rate includes an irregular timing between frames. The process may further include adjusting the user data based on the irregular timing of the intended display frame rate. The process may further include identifying user input to the user interface based on the intended display frame rate and the adjusted user data.

26 Claims, 9 Drawing Sheets

ADJUSTING USER DATA BASED ON A DISPLAY FRAME RATE

CROSS-REFERENCE TO RELATED APPLICATIONS

This application claims the benefit of U.S. Provisional Application Ser. No. 63/409,183 filed Sep. 22, 2022, which is incorporated herein in its entirety.

TECHNICAL FIELD

The present disclosure generally relates to systems, methods, and electronic devices for upsampling hand-based input using one or more input signals.

BACKGROUND

Hand-based input systems for identifying user input and displaying content based on the hand-based user input may be improved with respect to providing means for users to create, edit, view, or otherwise use content in an extended reality (XR) environment. For example, the asynchrony between a hardware-based clock (e.g., a frame rate of data from a camera on a device) and a software-based clock (e.g., a frame rate of a display of a user interface) may cause input judder when using a device (e.g., scrolling a web page) that is not desirable.

SUMMARY

Various implementations disclosed herein include devices, systems, and methods that utilize an adaptive upsampling technique to address judder and momentum loss issues caused by frame rate differences between camera and display rates. For example, an intended display frame rate may include a variable refresh rate of a display of a user interface (e.g., the intended display frame rate may be approximately 90 frames per second (FPS), but the intended display frame rate may vary during operation). In some implementations, the adaptive upsampling technique may combine interpolation and extrapolation (e.g., prediction) to achieve a constant delay between upsampled hands pose data and display time data. Because the delay is constant, the adaptive upsampling technique may prevent judder. Additionally, since the velocity estimates from upsampled samples are also consistent, the adaptive upsampling technique may prevent momentum loss. In some implementations, by changing boundaries of the extrapolation and/or interpolation times, the adaptive upsampling technique may achieve a variety of upsampling methods that may include interpolation only, prediction only, or a hybrid that includes a combination of interpolation and prediction.

In some implementations, the intended display frame rate is not guaranteed to provide regularly spaced frames as the inter-frame spacing may depend on user interface content. Adjusting the user data (e.g., hands-based user input) may avoid loss of momentum at lift off and/or interaction pose judder. For example, loss of momentum may occur because the hand may appear stationary for a few display frames and suddenly update as the new hands data comes, thus, if a user lifts his or her hand off at the frame where the hand appears stationary, momentum loss may happen. Moreover, juddery input may occur in all input (e.g., scrolling, pinch and drag, touch, etc.), because the hand motion increments are not typically consistent with the display timings (e.g., you may be moving your hand smoothly, but in the display, it may not move at all-in-one frame but move twice as fast in the next frame). For example, if the hands data were used without any adjustment (e.g., upsampling), each time the user interface runs, if the intended display frame rate of the user interface uses the latest hands update, then the hand would remain stationary for some frames and suddenly update when the next hands data comes. This display effect would not only render the input effectively to be at a lower frame rate than the display rate, but also input would be juddery because the "hands delay" to render time is different at each render. In some implementations, loss of momentum may occur while scrolling a web page while reading and a technique may track hand-based input, but as a user quickly moves his or her hand to moves the web page quickly (e.g., when a user lifts off or lets the web page go), the view may jump in frames, and a loss of momentum at lift off may occur during a pinch movement of two fingers (e.g., a pinch to zoom in or zoom out in a user interface window).

In some implementations, the user data may be adjusted to provide user data associated with the timing of a given intended display frame rate for a particular frame. In one example, the timing of an intended display frame rate may be delayed and the timing of the user data may be adjusted (e.g., extrapolated and/or interpolated) to provide a user data value corresponding to that intended display frame rate. In some implementations, if the average frame rate of the user data (e.g., hand-based user input) is less than the average frame rate of the intended display frame rate of the user interface, adjusting the timing of the user data may effectively up-sample the user data, e.g., providing user data instances corresponding to each frame of the faster and variable intended display frame rate of the user interface.

For example, hand-based user input (e.g., a finger touching a scroll bar control at a particular position at time 1 and then another position at time 2, etc.) may be identified using one or more input signals (e.g., images of the hand, depth data of the hand, and the position of content on a user interface). Since the input signals may have different sample rates (e.g., the images may be 30 frames per second (fps) and one or more elements of the user interface may update at 90 fps), the slower input signals may be up-sampled.

In general, one innovative aspect of the subject matter described in this specification can be embodied in methods that include the actions of, at a device having a processor, obtaining user data associated with an activity of a user via a sensor in a physical environment. The actions may further include obtaining an intended display frame rate corresponding to one or more portions of a user interface being presented within an extended reality (XR) environment, where the intended display frame rate having an irregular timing between frames. The actions may further include adjusting the user data based on the irregular timing of the intended display frame rate These and other embodiments can each optionally include one or more of the following features.

In some aspects, the actions may further include identifying user input to the user interface based on the intended display frame rate and the adjusted user data.

In some aspects, identifying user input to the user interface based on the intended display frame rate and the adjusted user data is based on determining a scene understanding.

In some aspects, identifying user input to the user interface based on the intended display frame rate and the adjusted user data is based on a sensor data signal, another sensor data signal, and a content position signal to identify the user input.

In some aspects, the sensor data signal, the another sensor data signal, and the content position signal are obtained at different frequencies.

In some aspects, adjusting the user data based on the irregular timing of the intended display frame rate is based on determining an average frame rate of the user data is less than an average frame rate of the intended display frame rate.

In some aspects, adjusting the user data based on the irregular timing of the intended display frame rate includes delaying user-interface-based frames and adjusting the user data to produce user data values corresponding to the timing of delayed frames via extrapolation or interpolation of user interface data corresponding to another time frame.

In some aspects, a sensor data signal of the sensor includes multiple sensor data signals. In some aspects, adjusting the user data based on the irregular timing of the intended display frame rate is based on determining a direction of a gaze. In some aspects, adjusting the user data based on the irregular timing of the intended display frame rate is based on tracking a viewpoint or a pose of a hand.

In some aspects, the user activity includes at least one of a hand position, a hand movement, an eye position, or a gaze direction.

In some aspects, the intended display frame rate having the irregular timing between frames includes a different amount of time of a time between a first frame and a subsequent second frame and a time between the second frame and a subsequent third frame.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
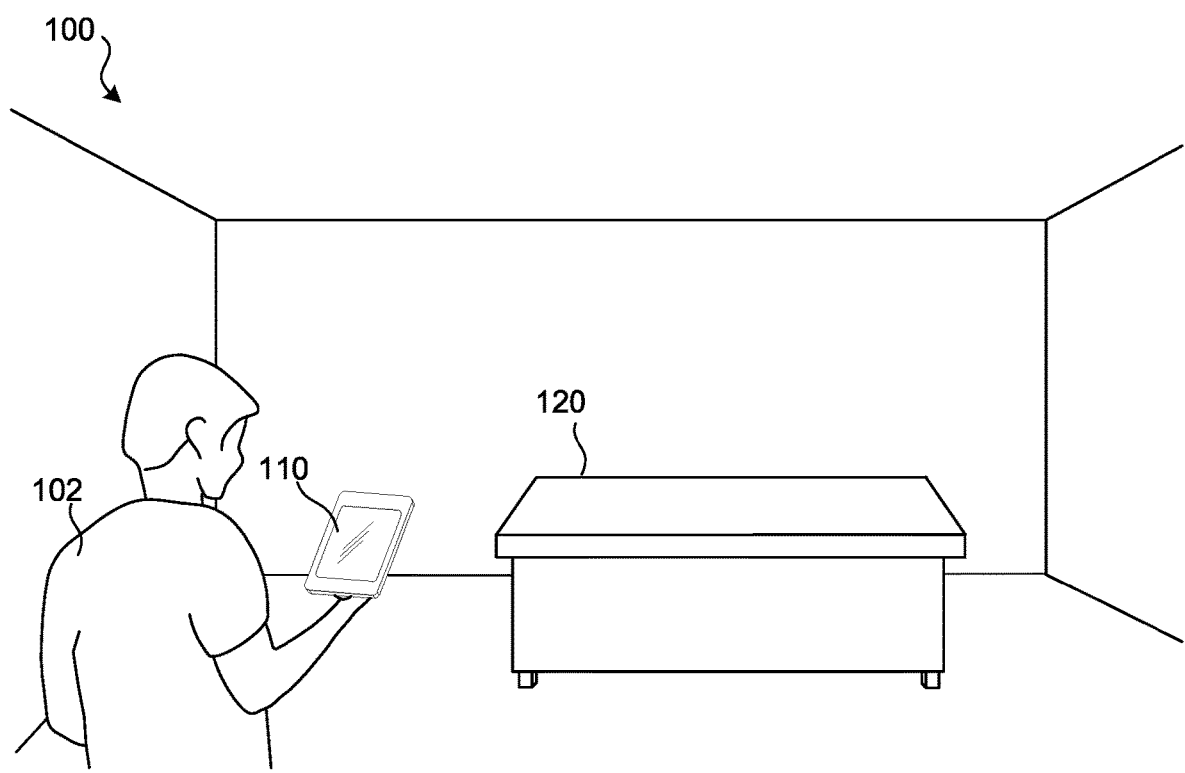
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may have direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

In some implementations, the device 110 obtains physiological data (e.g., EEG amplitude/frequency, pupil modulation, eye gaze saccades, etc.) from the user 102 via one or more sensors (e.g., a user facing camera). For example, the device 110 obtains pupillary data (e.g., eye gaze characteristic data). While this example and other examples discussed herein illustrates a single device 110 in a real-world physical environment 100, the techniques disclosed herein are applicable to multiple devices and multiple sensors, as well as to other real-world environments/experiences. For example, the functions of device 110 may be performed by multiple devices.

FIGS. 2A-2D illustrate views of an XR environment 210 provided by the device 110 of FIG. 1, including adjusting hand-based user input in accordance with some implementations. Each FIG. 2A-2D includes an exemplary user interface 230 of an application and a depiction 220 of desk 120 (e.g., a representation of a physical object that may be viewed as pass-through video or may be a direct view of the physical object through a transparent or translucent display). Additionally, each FIG. 2A-2D includes a representation 270 of a hand/arm of user 102. Providing such a view may involve determining 3D attributes of the physical environment 100 and positioning virtual content, e.g., user interface 230, in a 3D coordinate system corresponding to that physical environment 100.

In the examples of FIG. 2A-2D, the user interface 230 include various content items, including a background portion 235, an application portion 240, a control element 232, and a scroll bar 250. The application portion 240 is displayed with 3D effects in the view provided by device 110. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

Figure 2A:
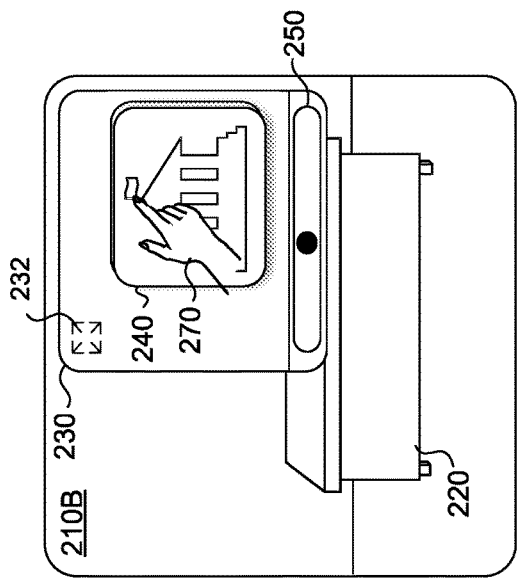
FIGS. 2A-2D illustrate views of an XR environment provided by the device of FIG. 1, including identifying hand-based user input in accordance with some implementations.
Figure 2B:
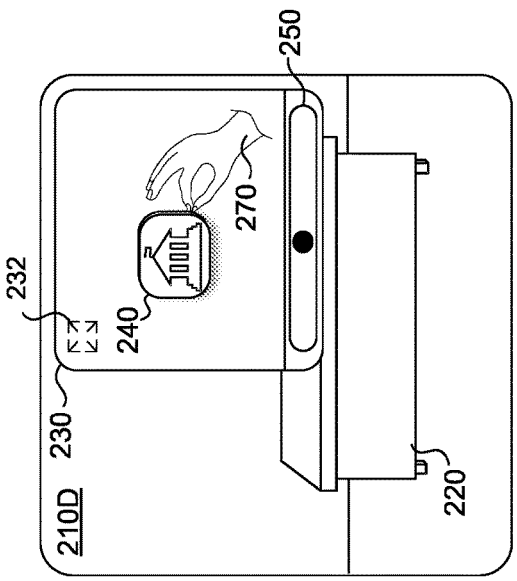
Figure 2C:
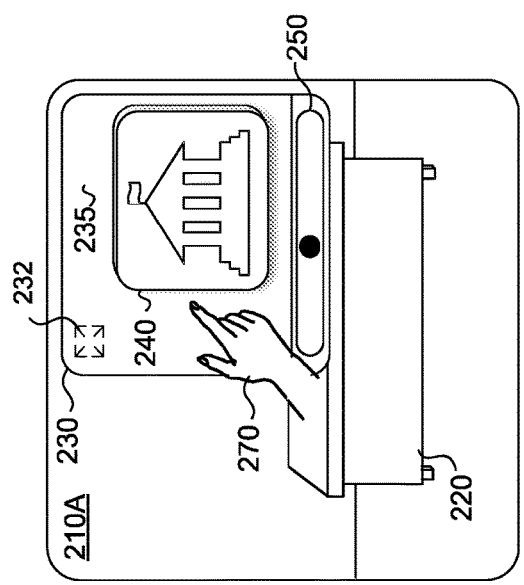
Figure 2D:
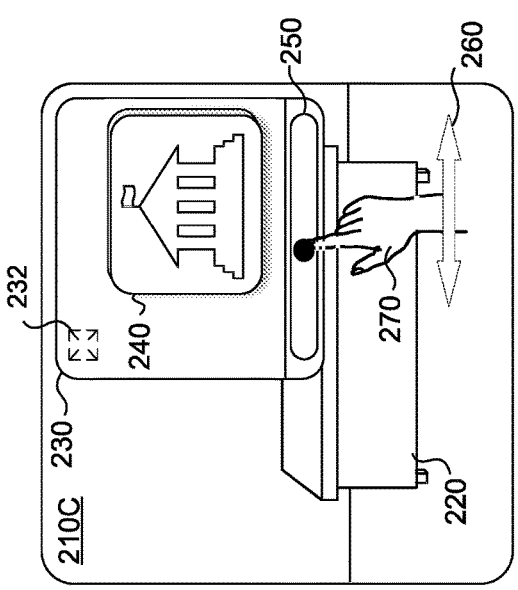

Each FIG. 2A-2D provides a different user interaction with the content displayed with the user interface 230. For example, FIG. 2A illustrates an XR environment 210A that includes a representation 270 of a hand/arm of user 102 as he or she is about to touch/interact with application content of the application portion 240 (e.g., a user wants to select the application window). FIG. 2B illustrates an XR environment 210B that includes a representation 270 of a hand/arm of user 102 as he or she is interacting with a particular element within the application portion 240 (e.g., a user wants to select the flag on top of the building). FIG. 2C illustrates an XR environment 210C that includes a representation 270 of a hand/arm of user 102 as he or she is interacting with the scroll bar 250 and moving the selectable element of the scroll bar 250 to initiate some type of rewind or fast forward action for the application content of the application portion 240 (e.g., a user wants to skip ahead or rewind to a particular portion of the application, such as a video content time scroll bar). FIG. 2D illustrates an XR environment 210D that includes a representation 270 of a hand/arm of user 102 as he or she is interacting with the application window of the application portion 240 (e.g., a user wants to collapse or reduce the application window using a pinching motion).

Figure 3:
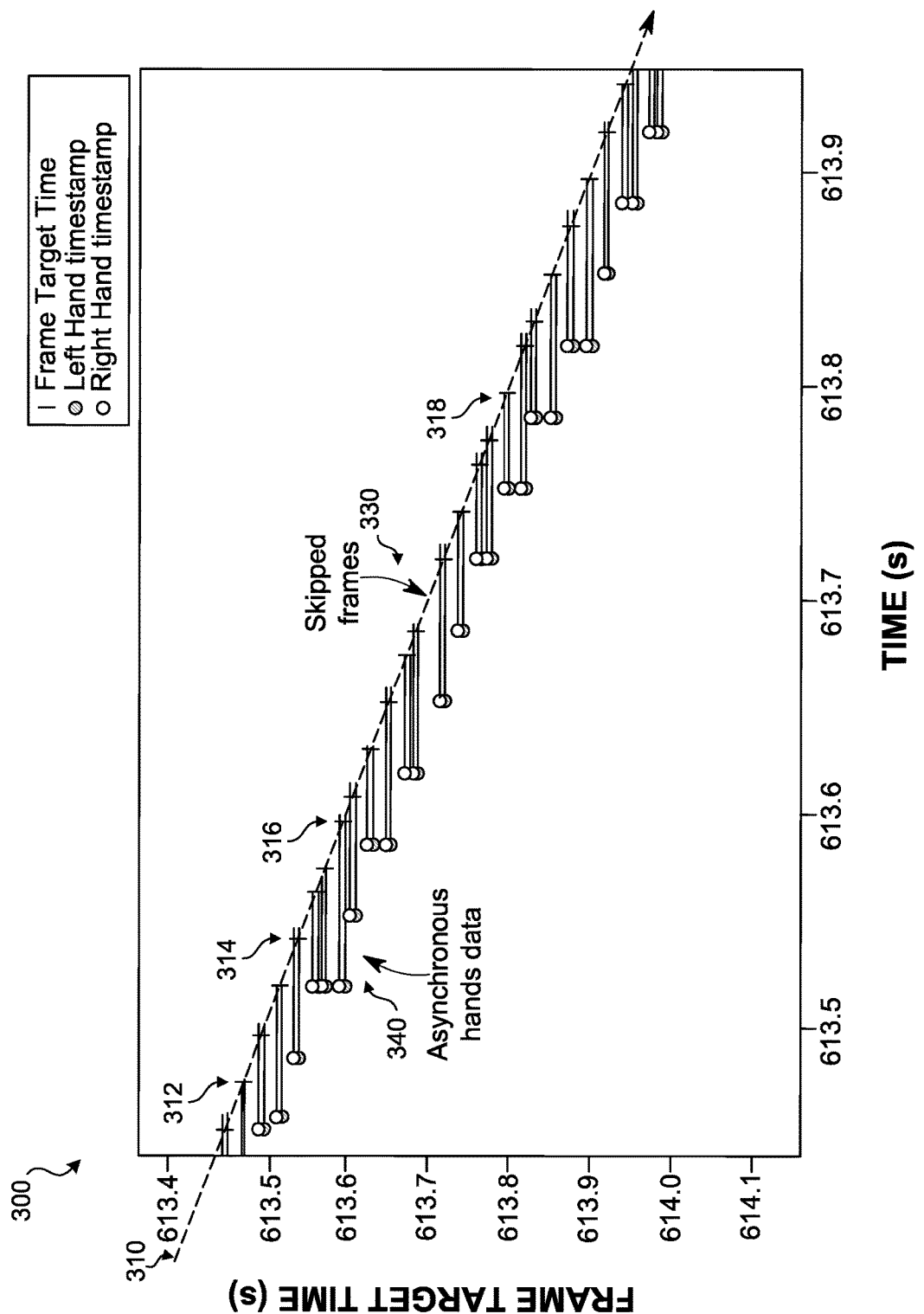
FIG. 3 illustrates an example graph of user data and an intended display frame rate in accordance with some implementations.

FIG. 3 illustrates an example graph 300 of user data (e.g., asynchronous hand movement data or other user based input) and an intended display frame rate (e.g., display frame rate data) in accordance with some implementations. Graph 300 illustrates the asynchronous nature of the user data (e.g., hands data or other user based input data) and the irregular timing of the intended display frame rate based on user input (e.g., hand-based user input) using one or more input signals in accordance with some implementations. In particular, graph 300 illustrates left-hand and right-hand timestamp information for a series of frame target times (e.g., times for rendering frames). The data for line 310 (e.g., vertical black bars) represents a series of time for rendering frames. For example, timestamps 312, 314, 316, and 318 are example points in time for rendering frame data. The skipped frame at area 330 illustrates the irregular timing of the intended display frame rate. For example, the intended display frame rate (e.g., display data) may not always be precisely 90 fps, instead, the intended display frame rate may vary and/or skip some frames of data. The asynchronous hands data indication at area 340 illustrates the asynchronous nature of hand movement data (e.g., which may create judder during display). For example, user data, such as hand movements, pose, etc., may be acquired by one or more asynchronous and/or multi-rate sensors (e.g., sensor networks, IoT, etc.) that may include multiple modules running on different sub-systems with different clocks, thus would have a different frame rate than the intended display frame rate (e.g., display frame rates). For example, if the hands data were used without any adjustment (e.g., upsampling), each time the user interface runs, if the intended display frame rate of the user interface uses the latest hands update, then the hand would remain stationary for some frames and suddenly update when the next hands data comes. This display effect would not only render the input effectively to be at a lower frame rate than the display rate, but also input would be juddery because the "hands delay" to render time is different at each render.

Figure 4:
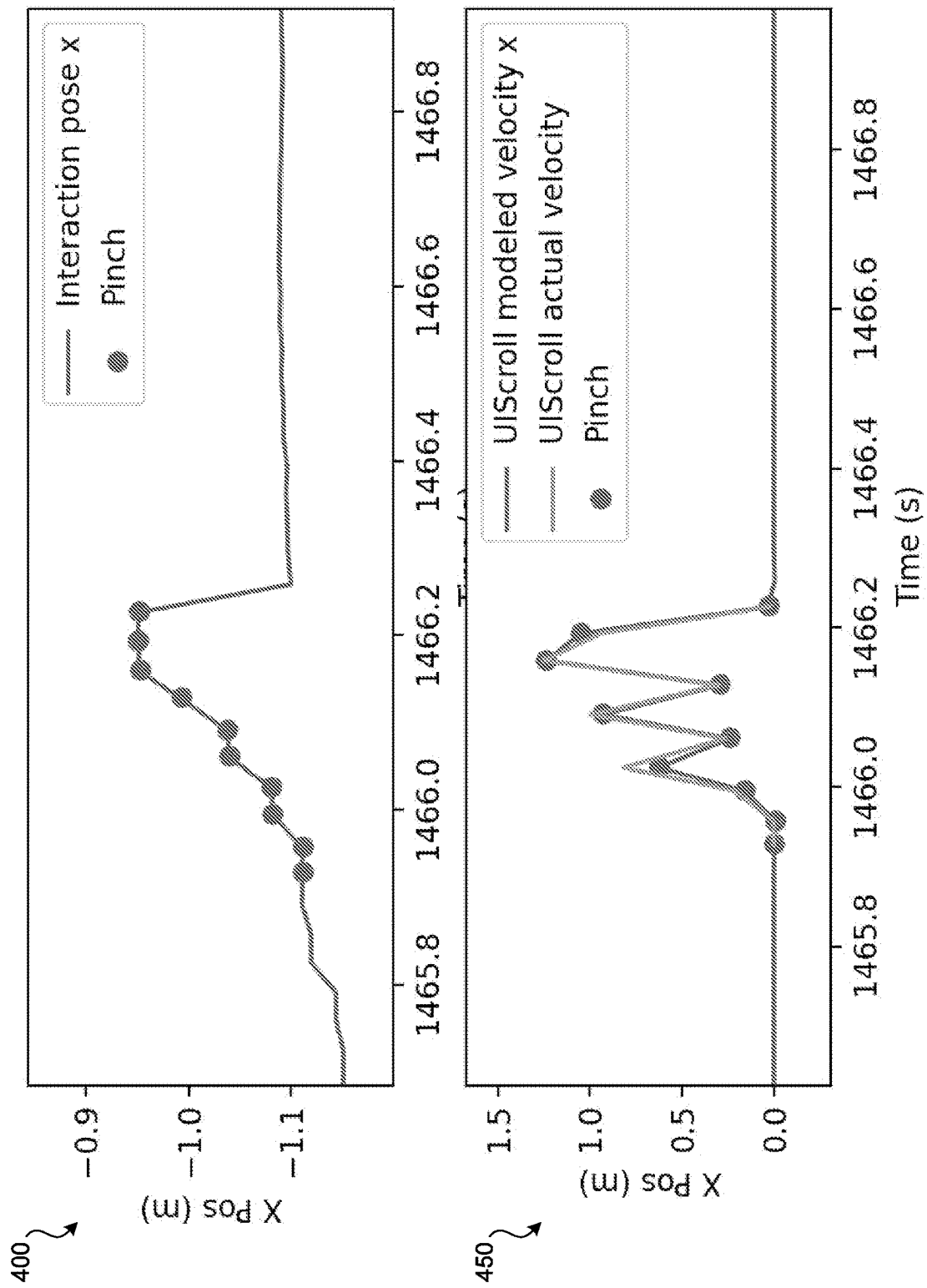
FIG. 4 illustrates example graphs of user data based on a pinch movement in accordance with some implementations.

FIG. 4 illustrates example graphs 400, 450 of user data based on loss of momentum in accordance with some implementations. A loss of momentum may occur while scrolling a web page while reading and a technique may track hand-based input, but as a user quickly moves his or her hand to moves the web page quickly (e.g., when a user lifts off or lets the web page go), the view may jump in frames, and a loss of momentum at lift off may occur during a pinch movement of two fingers (e.g., a pinch to zoom in or zoom out in a user interface window). In particular, graph 400 illustrates tracking a velocity of a hand movement of a user and a pinch action based on an interaction pose of a user's hand. Graph 450 illustrates a predicted velocity and actual velocity of a hand movement of a user and a pinch action based on an interaction pose of a user's hand. For example, the estimated velocity drops close to zero for every other frame (e.g., other than the pinch action), and if you lift-off at that instant, you would lose momentum (e.g., when a user lifts off or lets the web page go).

Figure 5:
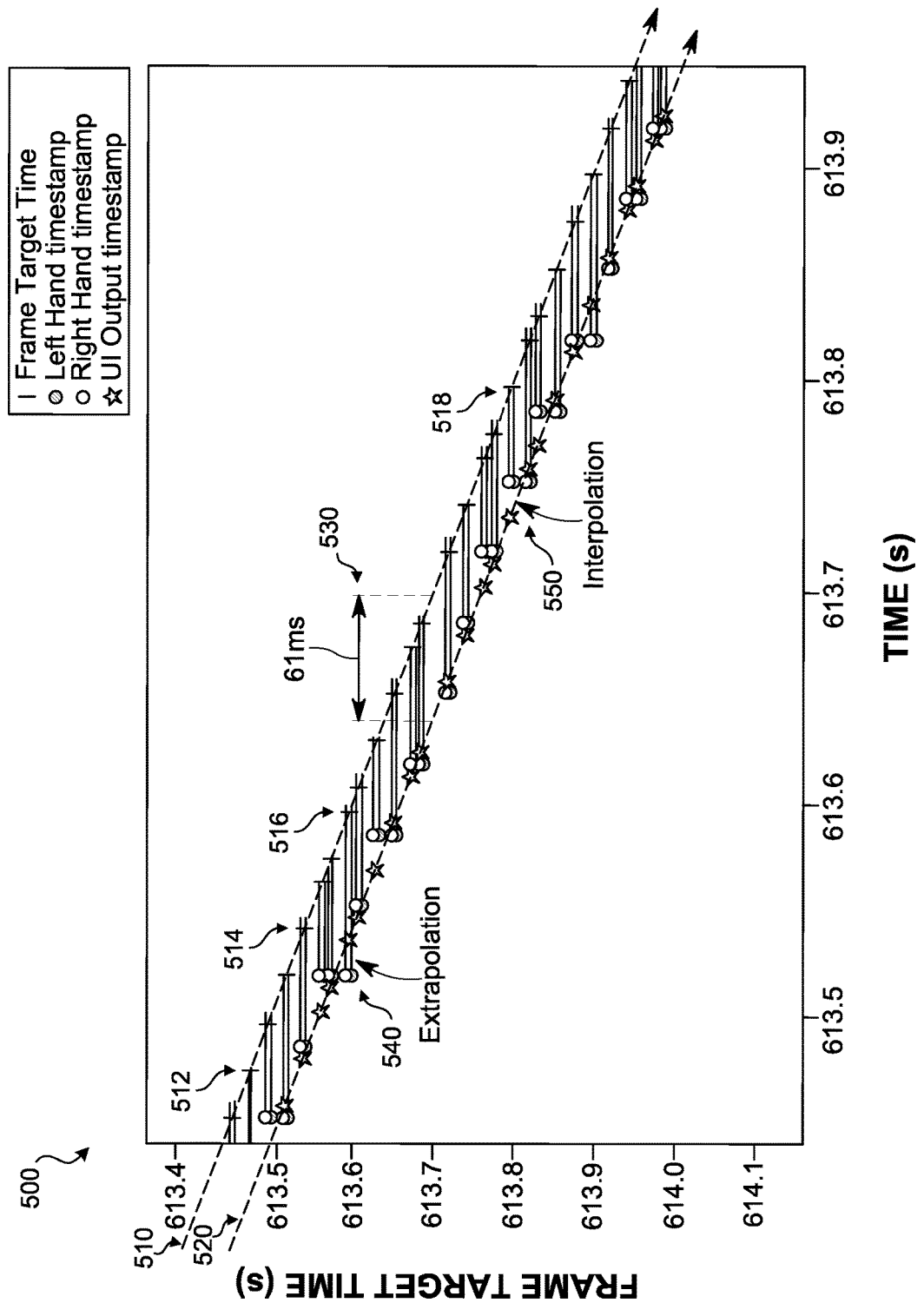
FIG. 5 illustrates an example graph for adjusting user data based on an intended display frame rate in accordance with some implementations.

FIG. 5 illustrates an example graph 500 of an adaptive upsampling technique for adjusting user data (e.g., asynchronous hand movement data) and an intended display frame rate (e.g., display frame rate data) of the graph 300 of FIG. 3, in accordance with some implementations. Graph 500 illustrates adjusting of input signals of the user data (e.g., hand data) based on the irregular timing of the intended display frame rate for adjusting user input (e.g., hand-based user input) using one or more input signals in accordance with some implementations. In particular, graph 500 illustrates left-hand, right-hand, and user interface output timestamp information for a series of frame target times (e.g., times for rendering frames). The data for line 510 (e.g., vertical black bars) represents a series of time for rendering frames. For example, timestamps, represented by vertical bars 512, 514, 516, and 518, are example points in time for rendering frame data. The data for line 520 represents an approximation of the lag time for the left-hand, right-hand, and user-interface-based output information. Based on the acquired information, in an exemplary implementation, the approximate difference between the data for line 510 and the data for line 520 is approximately 61 ms, as indicated at measured time for the delay time lag 530. The set difference in time between the data for line 510 and the data for line 520 (e.g., 61 ms) that results in the parallel trajectory between the two lines may be based on maintaining a delay from the hands-based data to a delay associated with the display-based data to remain constant which provides a smooth experience for interpolation and extrapolation when viewed by a user.

In some implementations, as illustrated in graph 500, at some points in time, the data (e.g., left and/or right-hand information) may not correlate to the determined approximate difference (e.g., 61 ms). Thus, at area 540, extrapolation may be used to estimate an unknown value based on extending a known sequence of values along line 520 as the left- and right-hand timestamp data show that there is greater than 61 ms lag at the recorded timestamp 516. Similarly, at area 550, interpolation may be used to estimate an unknown value based on known values that exist within a sequence of values along line 520 as the left- and right-hand timestamp data show that there is less than 61 ms lag at the recorded timestamp 518. Additionally, or alternatively, in some implementations, the delayed time for the delay time lag 530 may be varied and determined based on the frame rates of the user data inputs. For example, a smaller or larger delay may be utilized in order to correlate the input data signals between the user data and the intended display frame rate.

In some implementations, to counter the delay time lag 530, user data (e.g., hand data) may be up-sampled to the frame rate of the intended display frame rate (e.g., a display frame rate). In some implementations, to minimize judder, the upsampling time instant may be selected to have constant delay relative to frame target time (FTT) (e.g., delay time lag 530). Additionally, interpolation and/or extrapolation, or a combination thereof, may be dictated by latency and overshoot requirements (e.g., may force the delay-to-FTT to vary, but slowly). In some implementations, an "average-latency-neutral" approach with a window of [-0.5, 0.5] may be utilized.

In an exemplary implementation, zero delay (e.g., the dotted lines overlapping) would be desired. However, zero delay may not be possible because too much prediction may occur in time, provided the system delays. Additionally, the latency neutral approach and the bounds on prediction, interpolation, and the like, may be related to the upsampling algorithm used for determining the upsampling times as illustrated in FIG. 5.

Figure 6:
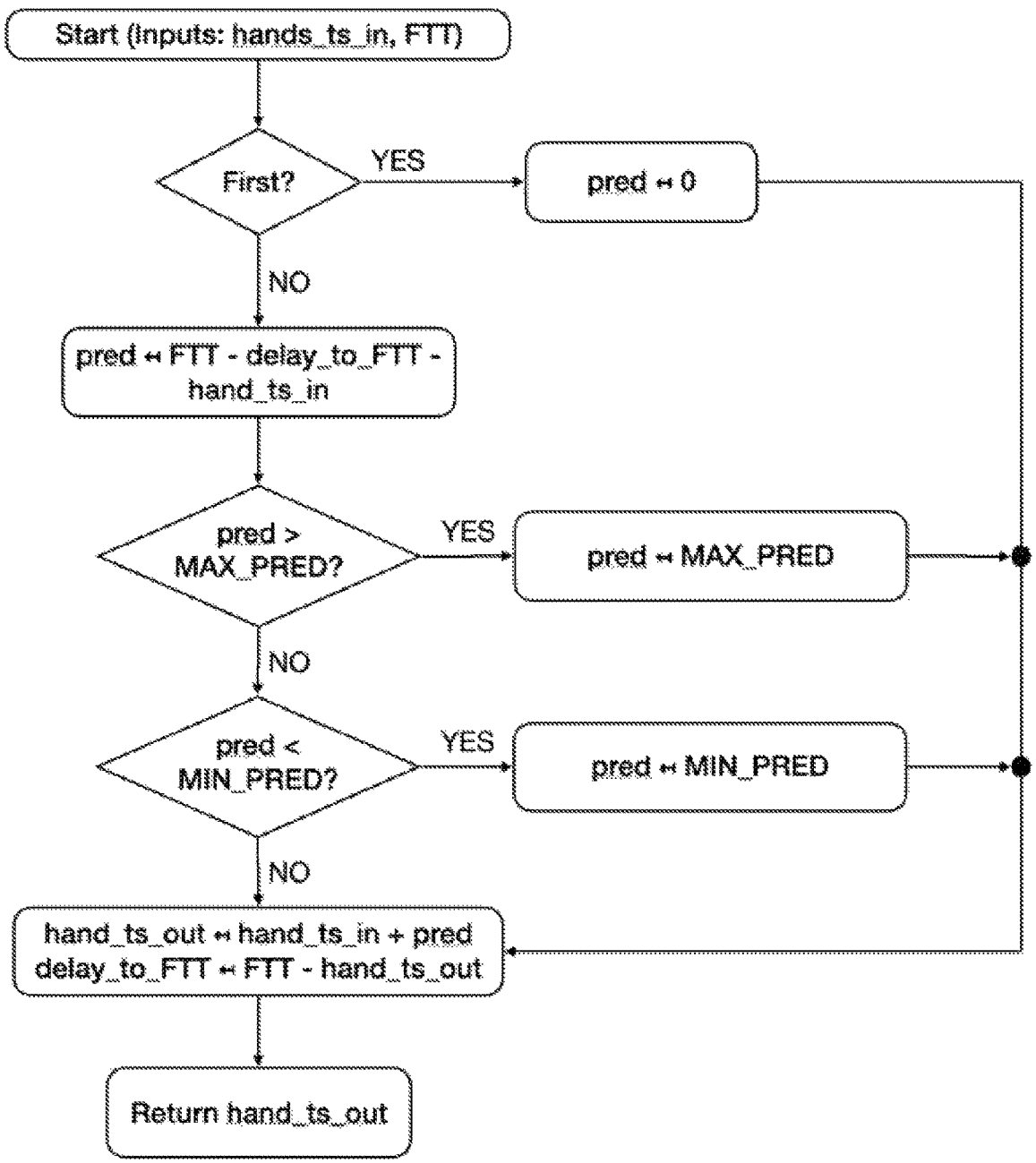
FIG. 6 is a block diagram illustrating a method for an adaptive upsampling technique for adjusting user data based on an intended display frame rate in accordance with some implementations.

FIG. 6 is a block diagram 600 illustrating a method for an adaptive upsampling technique for adjusting user data based on an intended display frame rate in accordance with some implementations. The techniques described herein determine the instant to which the adaptive upsampling technique should interpolate or extrapolate the hands, or in some instances, a hybrid that includes a combination of interpolation and extrapolation (e.g., prediction).

The FTT is a "Frame Target Time", that is, the time at which the frame is expected to show on the display (e.g., vertical bars 512, 514, 516 in the timing diagram of FIG. 5). The timestamp "hands_ts_in" indicates the instant that the sensors (e.g., cameras) captured the current hands data (e.g., latest "dot" in the timing diagram of FIG. 5). These are the inputs to the upsampling module. This becomes the effective timestamp of the upsampled hands (e.g., "hands_ts_out", which is the output of this module and also the "star" in the timing diagram).

To determine the "hands_ts_out", the upsampling algorithm first finds a prediction amount (e.g., "pred"). This number "pred" (e.g., the prediction value) is initially set to zero at the first time the upsampling module runs, and following the branch on the right-hand side, this determines the "delay_to_FTT" (e.g., the gap between the dotted lines in the timing diagram). In the subsequent runs, the prediction amount "pred" is determined according to the criterion of keeping the "delay_to_FTT" constant. With this criterion, the prediction value may be positive at some frames, which would lead to prediction and extrapolation, or zero or negative at other frames, which would lead to smoothing and interpolation.

There are bounds on prediction value "pred" that are dictated by how much that can be predicted reliably (e.g., "MAX_PRED"), or how much extra latency that can be introduced (e.g., "MIN_PRED", which is usually a negative number). If the initially computed value "pred" exceeds these boundaries, the prediction value is clipped to within that range. In some implementations, clipping may cause changes in the "delay_to_FTT" at the frame that it occurs. In some implementations, by changing the boundaries of the extrapolation and/or interpolation times (e.g., MAX_PRED, MIN_PRED, etc.), the adaptive upsampling technique may achieve a variety of upsampling methods that may include interpolation only, extrapolation/prediction only, or a hybrid that includes a combination of interpolation and extrapolation/prediction.

In some implementations, the block diagram 600 may further include monitoring the prediction value (e.g., "pred" value) and comparing the prediction value to a desirable target value, and if the prediction value is lagging behind the desired value, the upsampling algorithm may push the "pred" value to the desired value when the user is not interacting (e.g., thus limiting the judder impact of such a push). For example, when the frame rate of the display slows down due to system load, the upsampling algorithm may reduce the prediction value to a minimum to keep delay-_to_FTT constant. In some implementations, when the frame rate recovers, the prediction value can be moved back up to its nominal value (expected value at the expected frame rate) in order not to unnecessarily delay the hands.

Figure 7:
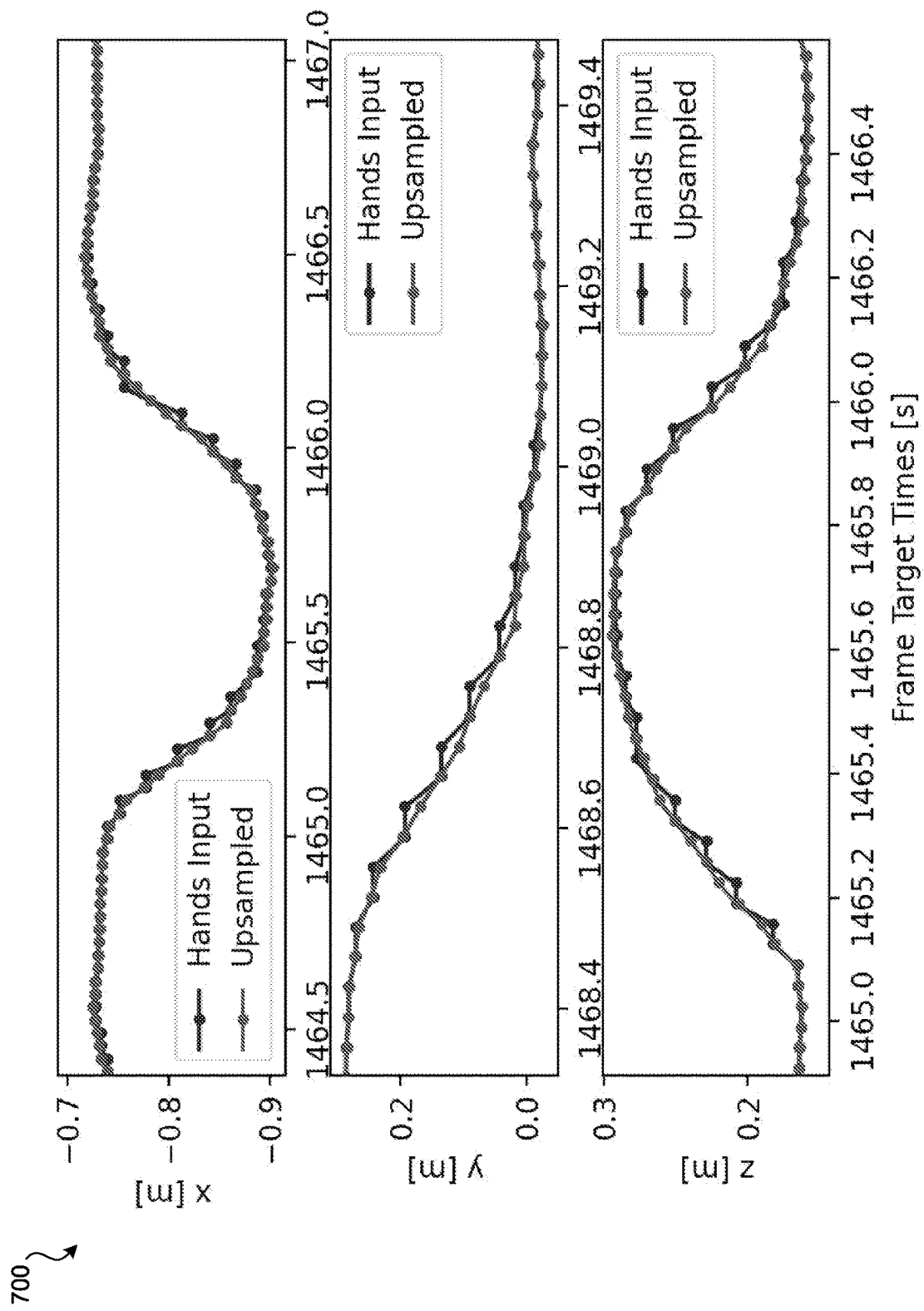
FIG. 7 illustrates an example graph for adjusting user data based on an intended display frame rate in accordance with some implementations.

FIG. 7 illustrates an example graph 700 for adjusting user data based on an intended display frame rate in accordance with some implementations. In particular, graph 700 illustrates upsampling the hands-based input data for each 3D coordinate axis (e.g., x-axis, y-axis, and z-axis). As illustrated in graph 700, by upsampling the hands-based input data, the data input become smoother, which in turn, would offset or help smooth any judder input issues from the hands-based input data.

Figure 8:
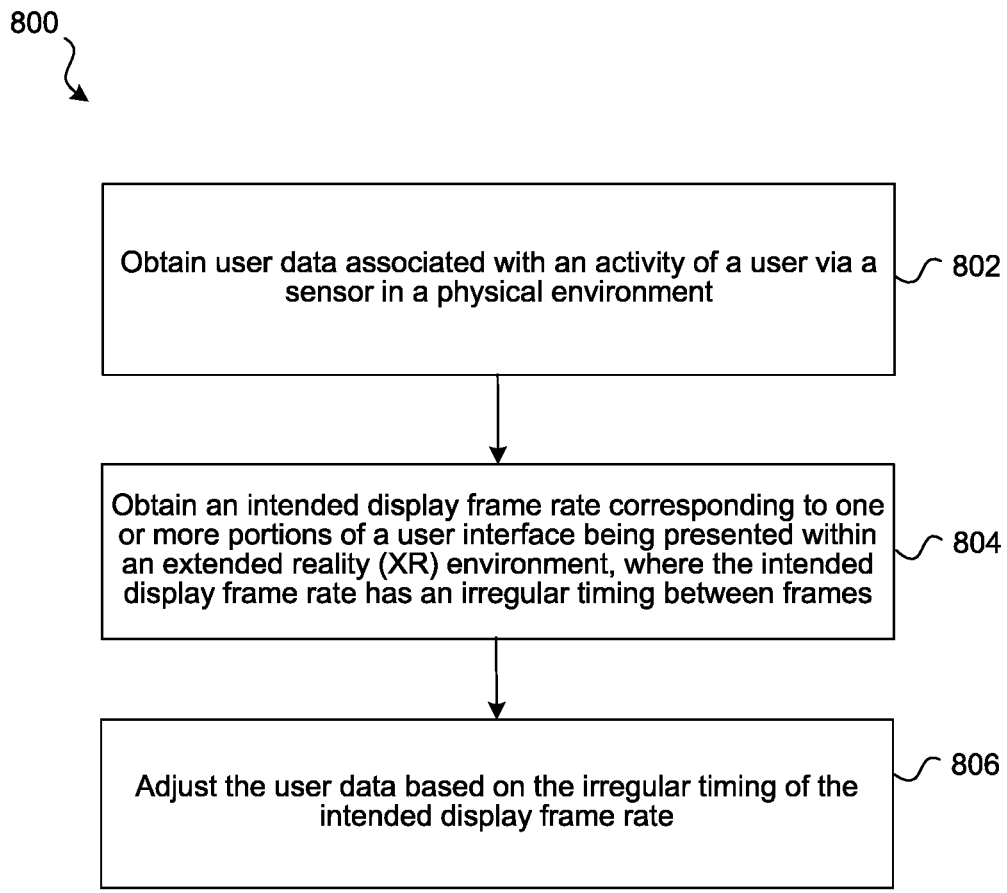
FIG. 8 is a flowchart illustrating a method for adjusting user input to a user interface based on an adjustment of user data based on irregular timing of an intended display frame rate in accordance with some implementations.

FIG. 8 is a flowchart illustrating a method 800 for adjusting (e.g., upsampling) hand-based user input using one or more input signals in accordance with some implementations. In some implementations, a device such as electronic device 110 performs method 800. In some implementations, method 800 is performed on a mobile device, desktop, laptop, HMD, or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 obtains user data (e.g., hands data) associated with an activity of a user via a sensor in a physical environment. In some implementations, the method 800 obtains a sensor data signal associated with multiple portions of a hand via a sensor in a physical environment for a period of time, the sensor data signal having a sample rate. For example, the sensor data may include RGB data, lidar-based depth data, and/or densified depth data. For example, sensors on a device (e.g., camera's, IMU, etc. on device 110) can capture information about the position, location, motion, pose, etc., of the head and/or body of the user 102, including tracking positions of the multiple portions of a hand. In some implementations, the user activity includes at least one of a hand position, a hand movement, an eye position, or a gaze direction.

In some implementations, the sensor data signal includes multiple sensor data signals. For example, one of the multiple sensor data signals may be an image signal, one of the multiple sensor data signals may be a depth signal (e.g., a structured light, a time-of-flight, or the like), one of the multiple sensor data signals may be a device motion signal (e.g., an accelerometer, an inertial measurement unit (IMU) or other tracking systems), and the like.

At block 804, the method 800 obtains an intended display frame rate (e.g., natural input based data) corresponding to one or more portions of a user interface being presented within an extended reality (XR) environment, where the intended display frame rate has an irregular timing between frames. In some implementations, the intended display frame rate having the irregular timing between frames includes a different amount of time of a time between a first frame and a subsequent second frame and a time between the second frame and a subsequent third frame. For example, as illustrated by skipped frames at area 330 of FIG. 3, the user-interface-based timestamps or frames are irregular, e.g., having differing amounts of time between successive frame times.

At block 806, the method 800 adjusts the user data based on the irregular timing of the intended display frame rate. In some implementations, adjusting the user data may avoid interaction pose judder and loss of momentum at lift off. For example, adjusting the user data may involve delaying user-interface-based frames and adjusting the user data (e.g., hand movement data) to produce user data values corresponding to the timing of those delayed frames via extrapolation or interpolation of user interface data corresponding to other time.

In some implementations, adjusting the user data based on the irregular timing of the intended display frame rate is based on determining an average frame rate of the user data is less than an average frame rate of the intended display frame rate. (e.g., at the slower frame rate of the UI content signal, adjusting the timing of the user data may effectively up-sample the user data, e.g., providing user data instances corresponding to each frame of the faster, variable user-based data frame rate.

In some implementations, adjusting the user data based on the irregular timing of the intended display frame rate includes delaying user-interface-based frames and adjusting the user data to produce user data values corresponding to the timing of delayed frames via extrapolation or interpolation of user interface data corresponding to another time frame. For example, as illustrated by delay time lag 530 in FIG. 5, a user-interface-based frame may be delayed (e.g., the output is delayed 61 ms as shown delay time lag 530) and the user data is adjusted (e.g., extrapolated and/or interpolated) to provide a user data value corresponding to that user-interface-based frame's time.

In some implementations, the method 800 identifies user input to the user interface based on the intended display frame rate and the adjusted user data. For example, identifying user input to the user interface based on the intended display frame rate and the adjusted user data may involve using the hand data to determine a hand position or hand gesture position relative to a user interface element position at a particular time, where the user interface element position is determined based on the intended display frame rate. In some implementations, identifying hand-based user input may involve using RGB images and depth images, and a user interface content position signal to identify the hand-based user input by adjusting the user data based on the irregular timing of the intended display frame rate.

In some implementations, identifying user input to the user interface based on the intended display frame rate and the adjusted user data is based on the sensor data signal (e.g., images), another sensor data signal (e.g., depth images), and a content position signal (e.g., user interface signal at 90 Hz) to identify the hand-based user input. In some implementations, the sensor data signal, the another sensor data signal, and the content position signal are obtained at different frequencies. For example, depth data associated with the hands may be updated at 30 Hz, while the user interface content may be updated at approximately 90 Hz, but since the intended display frame rate utilizes a software-based clock, may not be constantly updated at 90 Hz.

In some implementations, adjusting user input to the user interface based on the intended display frame rate and the adjusted user data is based on an upsampling process that enables identifying hand-based input at a rate that is faster than the sample rate of the sensor data signal. For example, the upsampling process may identify hand-based input (e.g., at 30 Hz) at the higher frame rate (e.g., at ~90 Hz) that is similar as the user interface content signal (e.g., ~90 Hz).

In some implementations, adjusting the user data based on the irregular timing of the intended display frame rate is based on determining a direction of a gaze. For example, adjusting hand-based user input based on the positions of the hand may be improved based on determining eye movement and gaze behaviors (e.g., focusing on an area of an object). For example, based on specular illumination of an eye, the device 110 may obtain eye gaze characteristic data via a high-power sensor, such as a complementary metal oxide semiconductor (CMOS). Additionally, or alternatively, the device 110 may obtain eye gaze characteristic data via a low-power sensor, such as a photodiode.

In some implementations, adjusting the user data based on the irregular timing of the intended display frame rate is based on tracking a viewpoint or a pose of a hand. For example, adjusting hand-based user input based on the positions of the multiple portions of the hand may be improved based on tracking a pose of each hand and/or a viewpoint of where the hand may be pointing (e.g., pointing to an area of a user interface element).

In some implementations, adjusting (e.g., upsampling) user input to the user interface based on the intended display frame rate and the adjusted user data is based on determining a scene understanding. For example, a scene analysis of an experience can be utilized to determine a scene understanding of the visual and/or auditory attributes associated with content being presented to the user (e.g., what is being presented in video content) and/or attributes associated with the environment of the user (e.g., where is the user, what is the user doing, what objects are nearby). These attributes of both the presented content and environment of the user can improve the determination of adjusting user input based on his or her eye movement and gaze behavior regarding an interaction event (e.g., focusing on an area of an object).

Figure 9:
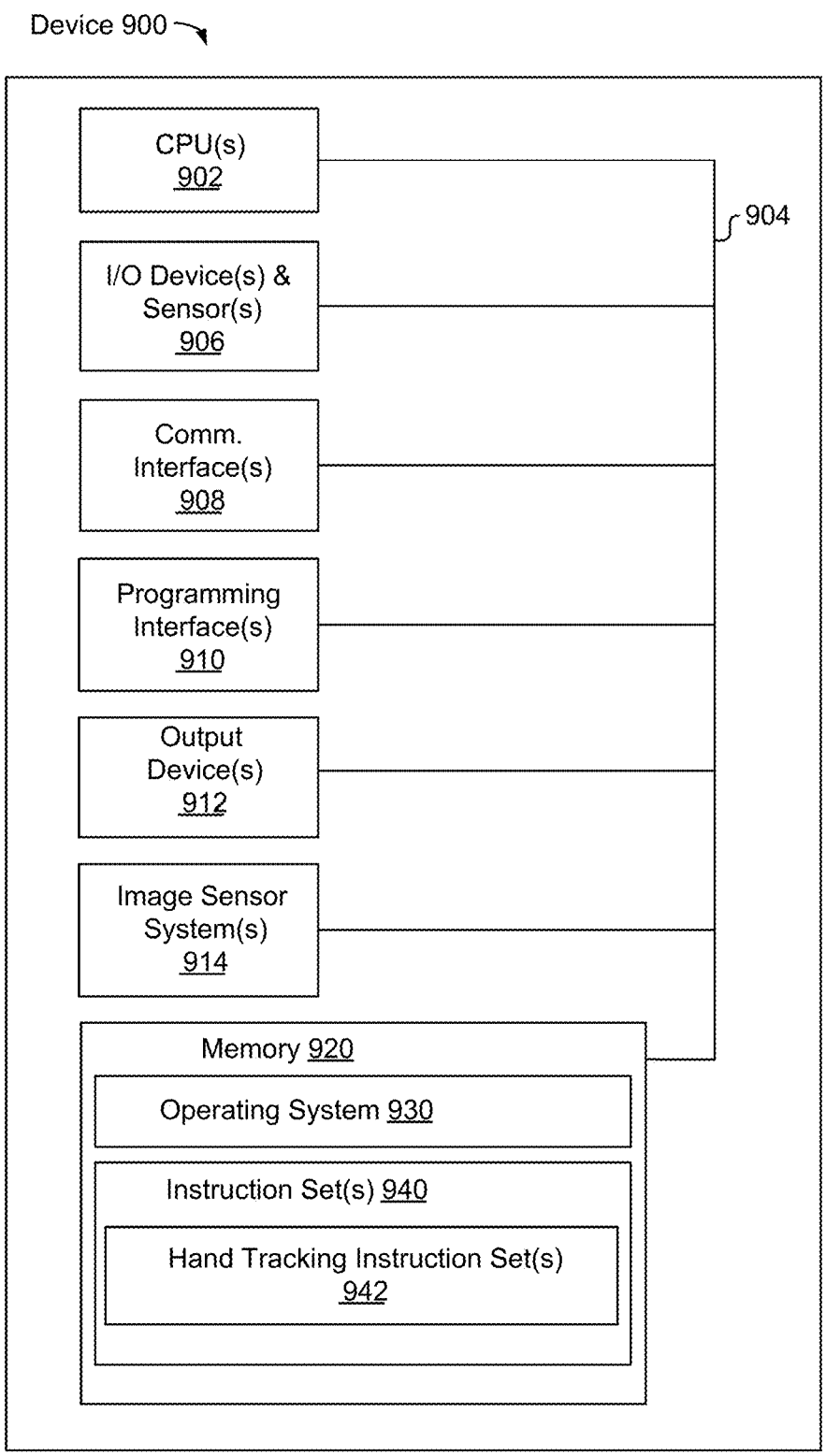
FIG. 9 is a block diagram of an electronic device of in accordance with some implementations.

FIG. 9 is a block diagram of electronic device 900. Device 900 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 910, one or more output device(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 912 include one or more displays configured to present a view of a 3D environment to the user. In some implementations, the one or more device(s) 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more output device (s) 912 include one or more audio producing devices. In some implementations, the one or more output device(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of an electrical charge. In some implementations, the instruction set(s) 940 are software that is executable by the one or more processing units 902 to carry out one or more of the techniques described herein.

The instruction set(s) 940 include hand tracking instruction set(s) 942 configured to, upon execution, obtain a sensor data signal associated with multiple portions of a hand via a sensor in a physical environment for a period of time and identify hand-based user input based on predicted positions of multiple portions of the hand as described herein. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present t disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:
1. A method comprising:
   at a device having a processor:
      obtaining user data representing a portion of a user during an activity, wherein the user data is obtained at a sample rate via a sensor in a physical environment;
      obtaining an intended display frame rate corresponding to one or more portions of a user interface being presented within an extended reality (XR) environment, the intended display frame rate having an irregular timing between frames; and adjusting the user data based on the irregular timing of the intended display frame rate and the sample rate of the user data.

2. The method of claim 1, further comprising:
identifying user input to the user interface based on the intended display frame rate and the adjusted user data.

3. The method of claim 2, wherein identifying user input to the user interface based on the intended display frame rate and the adjusted user data is based on determining a scene understanding.

4. The method of claim 2, wherein identifying user input to the user interface based on the intended display frame rate and the adjusted user data is based on a sensor data signal, another sensor data signal, and a content position signal to identify the user input.

5. The method of claim 4, wherein the sensor data signal, the another sensor data signal, and the content position signal are obtained at different frequencies.

6. The method of claim 1, wherein adjusting the user data based on the irregular timing of the intended display frame rate and the sample rate of the user data is based on determining an average frame rate of the user data is less than an average frame rate of the intended display frame rate.

7. The method of claim 1, wherein adjusting the user data based on the irregular timing of the intended display frame rate and the sample rate of the user data comprises delaying user-interface-based frames and adjusting the user data to produce user data values corresponding to the timing of delayed frames via extrapolation or interpolation of user interface data corresponding to another time frame.

8. The method of claim 1, wherein a sensor data signal of the sensor comprises multiple sensor data signals.

9. The method of claim 1, wherein adjusting the user data based on the irregular timing of the intended display frame rate and the sample rate of the user data is based on determining a direction of a gaze.

10. The method of claim 1, wherein adjusting the user data based on the irregular timing of the intended display frame rate and the sample rate of the user data is based on tracking a viewpoint or a pose of a hand.

11. The method of claim 1, wherein the user activity comprises at least one of a hand position, a hand movement, an eye position, or a gaze direction.

12. The method of claim 1, wherein the intended display frame rate having the irregular timing between frames comprises a different amount of time of a time between a first frame and a subsequent second frame and a time between the second frame and a subsequent third frame.

13. The method of claim 1, wherein the sample rate of the user data is different than the intended display frame rate.

14. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining user data representing a portion of a user during an activity, wherein the user data is obtained at a sample rate via a sensor in a physical environment;
obtaining an intended display frame rate corresponding to one or more portions of a user interface being presented within an extended reality (XR) environment, the intended display frame rate having an irregular timing between frames; and
adjusting the user data based on the irregular timing of the intended display frame rate and the sample rate of the user data.

15. The device of claim 14, wherein the program instructions further cause the one or more processors to perform operations comprising:
identifying user input to the user interface based on the intended display frame rate and the adjusted user data.

16. The device of claim 15, wherein identifying user input to the user interface based on the intended display frame rate and the adjusted user data is based on determining a scene understanding.

17. The device of claim 15, wherein identifying user input to the user interface based on the intended display frame rate and the adjusted user data is based on a sensor data signal, another sensor data signal, and a content position signal to identify the user input.

18. The device of claim 17, wherein the sensor data signal, the another sensor data signal, and the content position signal are obtained at different frequencies.

19. The device of claim 14, wherein adjusting the user data based on the irregular timing of the intended display frame rate and the sample rate of the user data is based on determining an average frame rate of the user data is less than an average frame rate of the intended display frame rate.

20. The device of claim 14, wherein adjusting the user data based on the irregular timing of the intended display frame rate and the sample rate of the user data comprises delaying user-interface-based frames and adjusting the user data to produce user data values corresponding to the timing of delayed frames via extrapolation or interpolation of user interface data corresponding to another time frame.

21. The device of claim 14, wherein a sensor data signal of the sensor comprises multiple sensor data signals.

22. The device of claim 14, wherein adjusting the user data based on the irregular timing of the intended display frame rate and the sample rate of the user data is based on determining a direction of a gaze.

23. The device of claim 14, wherein adjusting the user data based on the irregular timing of the intended display frame rate and the sample rate of the user data is based on tracking a viewpoint or a pose of a hand.

24. The device of claim 14, wherein the user activity comprises at least one of a hand position, a hand movement, an eye position, or a gaze direction.

25. The device of claim 14, wherein the intended display frame rate having the irregular timing between frames comprises a different amount of time of a time between a first frame and a subsequent second frame and a time between the second frame and a subsequent third frame.

26. A non-transitory computer-readable storage medium, storing program instructions executable on a device including one or more processors to perform operations comprising:
obtaining user data representing a portion of a user during an activity, wherein the user data is obtained at a sample rate via a sensor in a physical environment;
obtaining an intended display frame rate corresponding to one or more portions of a user interface being presented within an extended reality (XR) environment, the intended display frame rate having an irregular timing between frames; and
adjusting the user data based on the irregular timing of the intended display frame rate and the sample rate of the user data.

* * * * *